(12) United States Patent
Zolfaghari et al.

(10) Patent No.: US 9,237,104 B2
(45) Date of Patent: *Jan. 12, 2016

(54) NETWORK ASSESSMENT AND SHORT-TERM PLANNING PROCEDURE

(71) Applicant: AT&T INTELLECTUAL PROPERTY I, L.P., Atlanta, GA (US)

(72) Inventors: Ali Zolfaghari, San Ramon, CA (US); Christine E. Bouamalay, Oakland, CA (US); Miguel T. Molina, San Ramon, CA (US); Raghvendra G. Savoor, Walnut Creek, CA (US); Stephen S. Sowell, Kearney, MO (US); Ronald D. Crawford, Lawrence, KS (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 273 days.

This patent is subject to a terminal disclaimer.

(21) Appl. No.: 13/870,352

(22) Filed: Apr. 25, 2013

(65) Prior Publication Data

US 2013/0246649 A1    Sep. 19, 2013

Related U.S. Application Data

(63) Continuation of application No. 13/541,860, filed on Jul. 5, 2012, now Pat. No. 8,451,736, which is a continuation of application No. 11/315,139, filed on Dec. 23, 2005, now Pat. No. 8,238,248.

(51) Int. Cl.
- H04J 3/14 (2006.01)
- H04L 12/801 (2013.01)
- H04L 12/24 (2006.01)

(52) U.S. Cl.
CPC .......... *H04L 47/127* (2013.01); *H04L 41/145* (2013.01); *H04L 41/147* (2013.01); *H04L 41/0823* (2013.01); *H04L 41/22* (2013.01); *H04L 41/5009* (2013.01); *H04L 41/5077* (2013.01)

(58) Field of Classification Search
CPC ......... H04L 12/24; H04L 12/26; H04L 29/08; H04L 12/56; H04L 12/72; H04L 29/06; H04L 47/127; H04J 3/16; H04J 3/14
See application file for complete search history.

(56) References Cited

U.S. PATENT DOCUMENTS

| | | | |
|---|---|---|---|
| 6,894,991 B2* | 5/2005 | Ayyagari et al. | 370/325 |
| 2003/0055882 A1* | 3/2003 | Kawamura | 709/203 |
| 2003/0153265 A1* | 8/2003 | Hunt | 455/3.06 |
| 2003/0208523 A1* | 11/2003 | Gopalan et al. | 709/201 |

* cited by examiner

*Primary Examiner* — Andrew Lai
*Assistant Examiner* — Leon Andrews
(74) *Attorney, Agent, or Firm* — Greenblum & Bernstein, P.L.C.

(57) ABSTRACT

A method for relieving network node congestion includes determining an average of an aggregated load on a network node that routes network traffic, projecting a demand on the network node based on extrapolating the average of the aggregated load to a future period, determining a current level of congestion on the network node, and projecting a future level of congestion on the network node based on the projected demand and the current level of congestion. An available capacity of other network nodes in a portion of the communication network that includes the network node is determined, as well as whether the projected future level of congestion on the network node can be relieved using the determined available capacity of the other network nodes.

20 Claims, 4 Drawing Sheets

NETWORK ASSESSMENT AND SHORT-TERM PLANNING PROCEDURE

CROSS-REFERENCE TO RELATED APPLICATIONS

The present application is a continuation application of U.S. patent application Ser. No. 13/541,860, filed on Jul. 5, 2012, now U.S. Pat. No. 8,451,736, which is a continuation application of U.S. patent application Ser. No. 11/315,139, filed on Dec. 23, 2005, now U.S. Pat. No. 8,238,248, issued on Aug. 7, 2012, the contents of which are expressly incorporated by reference herein in their entireties.

BACKGROUND

1. Field of the Disclosure

The present disclosure relates to network engineering and planning. More particularly, the present disclosure relates to identifying projected blocked nodes in a communications network.

2. Background Information

Conventional transport network analysis, design and planning methods and procedures (M&P) are typically directed to long-term planning, and rely heavily on manual ad hoc approaches. Also, the focus is on the capacity of the trunks terminating at various network elements, as opposed to the total capacity of each of the network elements. These methods are often inadequate, particularly in view of rapidly emerging technologies and market dynamics. In particular, conventional techniques for predicting long-term network demands and identifying capital equipment over an extended period of time neglect to consider short-term trends or to otherwise address near-term network requirements.

In other words, the existing network planning tools are inadequate to address today's dynamic short-term needs. For example, due to the increase in fiber connectivity in transport networks, the task of projecting requirements and manually designing optimal transport networks to meet short-term demands is complex and impractical. Therefore, a comprehensive, automated process is needed for identifying short-term network requirements, which can ultimately be used for developing and implementing short-term network plans.

BRIEF DESCRIPTION OF THE DRAWINGS

The present disclosure provides the detailed description that follows by reference to the noted drawings by way of non-limiting examples, in which like reference numerals represent similar parts throughout several views of the drawings, and in which.

DETAILED DESCRIPTION

Figure 1:
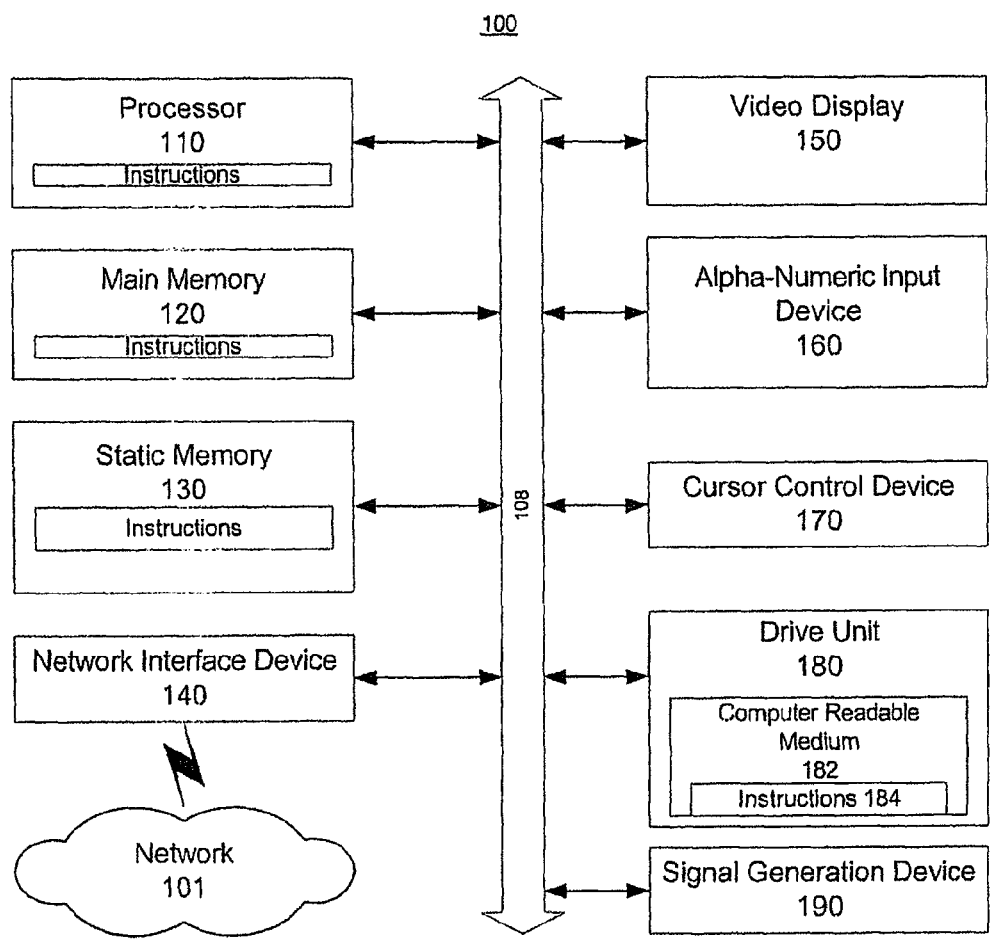
FIG. 1 shows an exemplary general computer system that includes a set of instructions for performing processing, according to an aspect of the present disclosure.

The present disclosure relates to network for enabling a user to efficiently and accurately identify, analyze and project network node blockages in the short-term, e.g., over the next two to six months. The disclosure provides mechanized M&P and tools enabling network engineers/planners to create more efficient network designs that maintain acceptable levels of Quality of Service (QoS) and, at the same time, enable service providers to gain significant capital expenditure and operating expenditure savings. The process includes analysis of physical attributes of an existing telecommunications network based on short-term projected end-to-end demands (which include type and amount). Network providers may realize significant savings by efficient utilization and optimum design/planning of backbone transport networks by accurately predicting (and ultimately relieving) network capacity bottlenecks or "blocked nodes," for example, in synchronous optical networks (SONETs).

The disclosure enables network planning based on "Just-In-Time" (JIT) network build concepts. Generally, JIT build methods streamline the engineering process, and shorten the time for planning and installing network infrastructure and associated service support. The present disclosure enables accurate prediction of network capacity exhaustion, thus allowing accurate and optimal deployment of capital for the network "just in time." The process is applicable to all types of transport networks including large networks with highly pre-invested assets. The process is based on analysis of projected short term end-to-end service and circuit demands. The results will ultimately enable network planners to develop the lowest overall network cost solution by performing network node capacity blockage assessments, evaluating long term plans, developing transport systems deployment or priority plans and generating incremental efficient routing plans.

In view of the foregoing, the present disclosure, through one or more of its various aspects, embodiments and/or specific features or sub-components, is thus intended to bring out one or more of the advantages as specifically noted below.

An aspect of the present disclosure provides a method for predicting node blockage in a telecommunications network. The method includes determining an aggregated load on a network node; projecting a demand on the node based on the aggregated load; determining a current level of blockage on the node; and projecting a level of blockage of the node based on the projected demand and the current level of blockage. The node may be a central office (CO), for example.

Determining the aggregated load on the network node may include selecting a period of time over which to evaluate the aggregated load; selecting an interval within the period of time for determining at least one interval average of the aggregated load; and determining a moving average of the aggregated load over the period of time based on the at least one interval average. Projecting demand may include extrapolating the moving average over a further time period. To determine the current level of blockage on the node, the following formula may be applied:

$$Bco, i = (\Sigma \text{all links } Cu, i)/(\Sigma \text{all links } Ct, i) \qquad (1)$$

where $Bco,i$ is the blockage of CO "i", with total capacity $Ct,i$ and used capacity $Cu,i$.

The method may further include extracting network data from a database. Determining the aggregated load on the network node and/or determining the current level of blockage on the node may then be based on the extracted network data. The extracted network data may include historical data relating to utilization of the node, and determining the aggregated load on the network load may be based on the historical data. The extracted network data may include transport system data corresponding to the node, and determining the current level of blockage on the node may be based on the transport system data.

Another aspect of the present disclosure provides for a computer readable medium that stores a program for predicting node blockage in a network. The computer readable medium includes an aggregated load determining code segment that determines an aggregated load on a network node; a projected demand code segment that projects a demand on the node based on the aggregated load; a blockage determining code segment that determines a level of blockage on the node; and a projected blockage code segment that projects a projected level of blockage of the node based on the projected demand and the current level of blockage. The computer readable medium may also include a display code segment that generates a node blockage report based on the projected level of blockage of the node, and displays the node blockage report. The projected demand code segment may project the demand on the node based on a moving average analysis of the aggregated load.

The computer readable medium may also include an extracting code segment that extracts network data from a database. The extracted network data may include historical data relating to utilization of the node, which the aggregated load determining code segment may use to determine the aggregated load on the node. The extracted network data may include transport system data corresponding to the node, which the blockage determining code segment uses to determine the level of blockage the node. Also, the computer readable medium may include an analyzing code segment that determines whether a circuit rearrangement or a system reconfiguration relieves the projected level of blockage of the network node.

Another aspect of the present invention provides a method for determining a projected level of blockage of a node in a network. The method includes collecting historical data regarding node usage and collecting data regarding current transport system usage. Historical data relating to the network node is extracted from the collected historical data, and transport system data relating to the network node is extracted from the collected current transport system data. An aggregated load on the network node is determined based on the extracted historical data, and a demand on the network node is projected based on the aggregated load. A current level of blockage on the network node is determined based on the extracted transport system data. The projected level of short-term blockage of the network node is then determined based on the projected demand and the current level of blockage.

A projected node blockage report may be generated based on the projected level of short-term blockage, and displayed on a graphical user interface. A circuit rearrangement or a system reconfiguration in the network may be identified in response to the node blockage report. Further, whether the circuit rearrangement or the system reconfiguration relieves the projected level of short-term blockage of the network node may be determined.

The various aspects and embodiments of the present disclosure are described in detail below.

Referring to FIG. 1, a description is now provided of an illustrative embodiment of a general computer system 100, on which the projected short-term network demand process can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Using a general computer system as shown in FIG. 1, a process for identifying projected short-term node blockage, also referred to as the JIT tool, in a network may be provided. The system of FIG. 1 can also operate as various elements with the network. For example, a program implementing the projected short-term node blockage process may be loaded and executed on a centralized server, accessible by network planners of various regions using a graphical user interface (GUI) over data networks, such as an internal corporate intranet, the public Internet or other packet switching network. Alternatively, the program may be run locally on a personal computer, or a server dedicated to a particular user group or region. As discussed below, the server should access, directly or indirectly, historical data relating to the network, for example, by interfacing with legacy data collection and storage systems.

Figure 2:
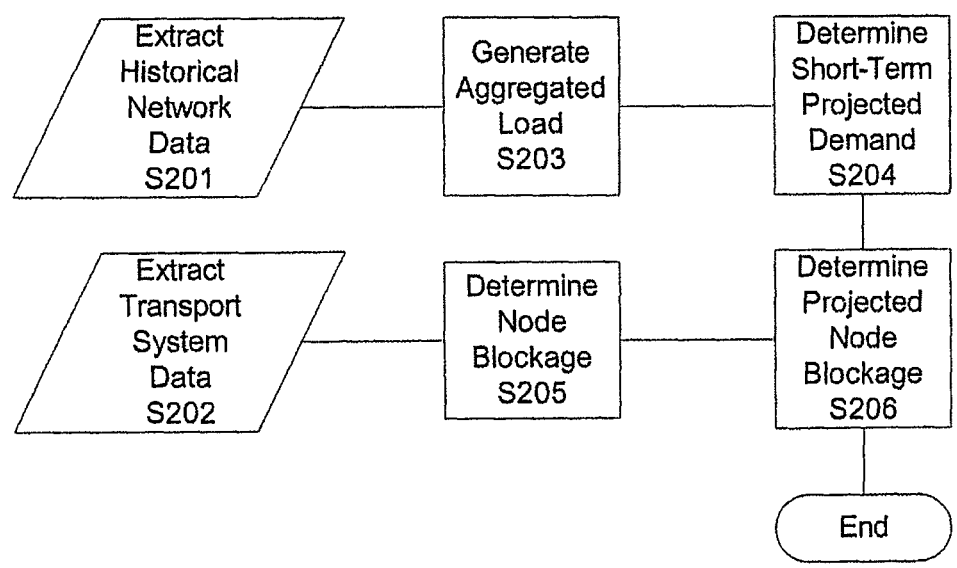
FIG. 2 shows an exemplary process for identifying projected short-term node blockage in a network, according to an aspect of the present disclosure.

Referring to the exemplary flowchart of FIG. 2, the relevant, actual historical data of the network is extracted at step S201. The historical data relates to the network nodes, such as central offices (COs), or portion of the network being evaluated. The historical data may be extracted, for example, from a server or database of previously collected information relating to multiple networks or regions, accessible by network planners of various regions over data networks, such as an internal corporate intranet, the public Internet or other packet switching network.

The historical data is collected over as long a period of time as possible, so that it represents an accurate basis for analysis, and includes the total number of units allocated to circuits between customer endpoints. The data may be collected periodically from network legacy systems, such as the Trunk Integrated Records Keeping System (TIRKS) and the Total Network Data System (TNDS). The integrity of the data may be verified, for example, by analyzing for format incompatibility, ill-formed and missing records, and poorly-defined semantics. Some problems in data integrity, such as interval irregularity and missing quantities, may be corrected, for example, by assuming a constant value until more accurate data is available, or by performing linear interpolation using the existing data. An exemplary method for collecting historical data is described in co-pending patent application Ser. No. 10/838,179, filed May 3, 2004, the contents of which are incorporated by reference herein in their entirety.

At step S202, information regarding existing transport systems is likewise extracted to evaluate currently available capacity on each network link and to estimate available capacity on corresponding nodes or COs. The existing transport systems may include, for example, Async, SONET or SDH transport systems with point-to-point, linear, chain or ring topologies. The JIT tool extracts relevant fields and information from legacy systems, such as TIRKS and TNDS. In an embodiment, the transport system data, like the historical data discussed above, is previously collected and stored in a central server or database. Because the transport system data should be current, and preferably real-time data, the database of transport system data should be updated at frequent intervals, for example once each week or once every other week. The relevant fields and information relating to a particular transport system may include, for example, the name, topology, type, maximum capacity, and capacity used on the system.

The processing of the extracted historical data and transport system data follow different paths, as indicated in FIG. 2, and may be executed simultaneously, sequentially, or in any combination thereof without affecting the scope or spirit of the present invention. With respect to the actual historical data collected at step S201, the aggregated load for each CO is generated at step S203. The aggregated load is generated by considering the number of circuits assigned over a particular time period. The relevant node statistics can then be calculated using the node's generated aggregated loads.

Figure 3:
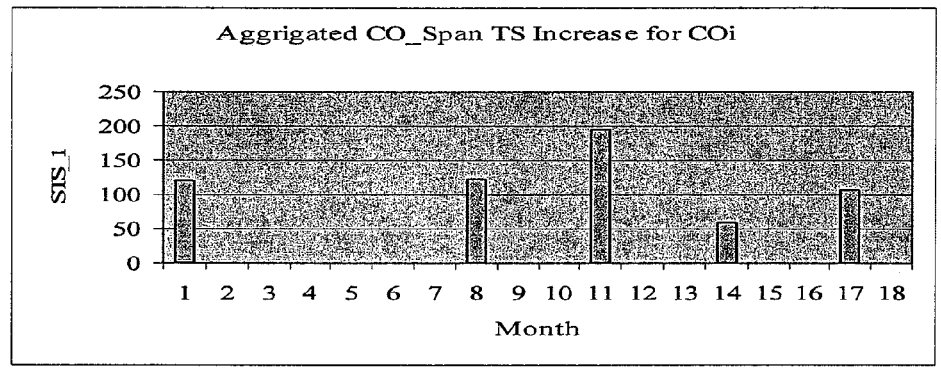
FIG. 3 shows exemplary historical data relating to a network node, for use according to an aspect of the present disclosure.

An example of actual historical data for a medium CO is shown in FIG. 3. In particular, FIG. 3 shows the number of circuits of one CO (e.g., a Synchronous Transport Signal level 1 (STS-1)) assigned to customers over an 18 month period of time. Over the historical period evaluated, the aggregated load exhibits a pattern of periodic jumps. For example, approximately 120 circuits were assigned in Month 1, 120 circuits were assigned in Month 8, 190 circuits were assigned in Month 11, 60 circuits were assigned in Month 14 and 110 circuits were assigned in Month 17. In an embodiment, the pattern of jumps is approximated by a step function. The interval at which the jumps occur, or window size, may be derived manually or automatically, based on the aggregated load data. For example, based on the data of FIG. 3, a window size of seven would be the minimum acceptable window, in that seven months is the shortest period of time during which circuits were assigned in at least one month. In other words, a window size of six or less would result in at least one interval having zero circuits assigned, which may improperly skew the moving average calculation.

Further, in an embodiment, the raw aggregated load quantities are presented in textual and graphical form to a network planner familiar with the given network. This enables the network planner to override the automatically derived window size, if necessary, based on additional pertinent considerations not accounted for in automatic derivation, such as current market conditions and past or anticipated changes in technology.

Once the step function has been determined, the short-term projected demand (SPD) is generated using the node's aggregated loads for each CO at step S204. The aggregated historical data is extrapolated over a short period of time, e.g., two to six months, into the future. This allows the network planners to identify nodes that are running out of capacity.

Figure 4:
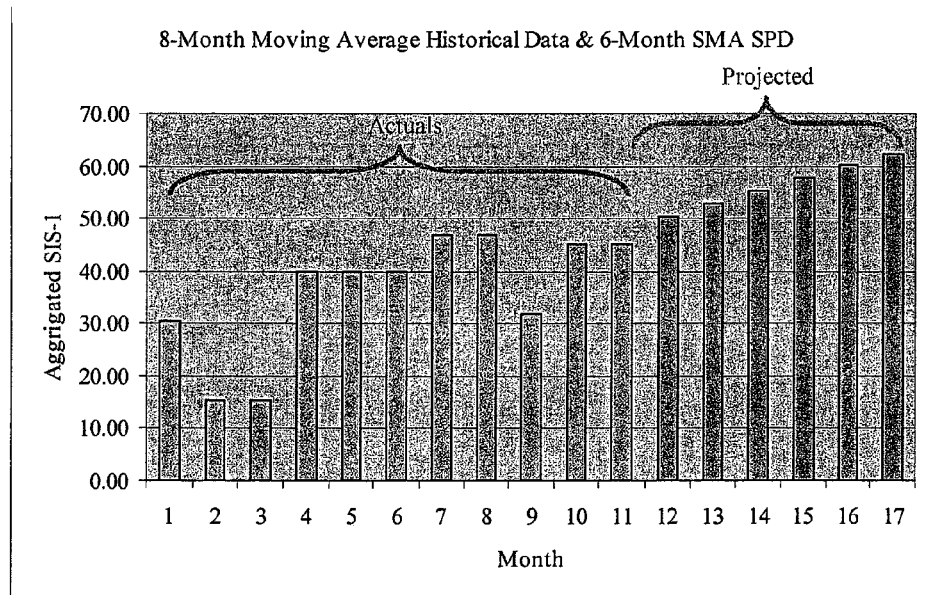
FIG. 4 shows exemplary aggregated historical data and projected data relating to a network node, for use according to an aspect of the present disclosure.

An example of the SDP result for a CO is shown in FIG. 4, which is based on the exemplary node's aggregated loads depicted in FIG. 3. FIG. 4 has two portions: the monthly averages, which may be based on any known moving average calculation, and the projected demand, extrapolated from the actual monthly averages. In particular, Month 1 through Month 11 show the actual aggregated load, which has been averaged over the 18 months using a seven month interval, as described above. (This results in apparent actual averages over only 11 months, because of the seven month window size.) The SPD for the next six months, i.e., Month 12 through Month 17, is projected using the moving average calculation based on the actual aggregated load of the previous 11 months. In alternative embodiments, any statistical forecasting techniques may be applied to determine the average aggregated load.

Meanwhile, at step S205 the current level of node blockage for each CO is determined, based on the extracted transport system information. Node blockage (e.g., CO blockage) refers to the condition of a node that has no circuits available, as defined as follows:

$$B_{co,i} = (\Sigma_{all\ links} C_{u,i})/(\Sigma_{all\ links} C_{t,i}) \quad (1)$$

Where $B_{co,i}$ is the blockage of CO "i", with total capacity $C_{t,i}$ and used capacity $C_{u,i}$. When all link capacities terminating in a CO are completely used, the CO is completely exhausted and fully blocked. In other words, in accordance with equation (1), the sum of all used capacity links divided by the sum of all total capacity links is one. Complete CO blockage occurs, for example, in SONET networks when a CO cannot accommodate additional circuits or links to other COs in one or more SONET rings.

Using the disclosed JIT tool for a selected set of COs (or network of interest), the existing transport systems with their total and used link capacities are extracted and then, using formula (1), the CO blockage is calculated. In addition, the JIT tool calculates utilization of all links, whole systems (e.g., the whole SONET ring) and the CO's connectivity.

Based on each CO's short-term projected demand, determined at step S204, and the current node blockage, determined at step S205, a short-term projected node blockage report is generated at step S206. In this report, relevant information on selected COs are summarized and formatted. In particular, the short-term projected demand on each selected CO is evaluated in view of the level of node blockage currently experienced by the CO. For example, a combination of a high level of blockage and high projected demand of a particular CO indicates that the corresponding portion of the network, or ring, should be supplemented in the near future. When short-term blockage and/or projected demand is relatively low, the CO may be identified as not warranting short-term action, and may be available to alleviate more strained portions of the network.

The report is displayed on the network planner's GUI, for example, enabling manual analysis of the data to address short-term network needs. In an embodiment, the report data is automatically loaded to a subsequent module for automated analysis of potential circuit rearrangements or topology reconfiguration.

Figure 5:
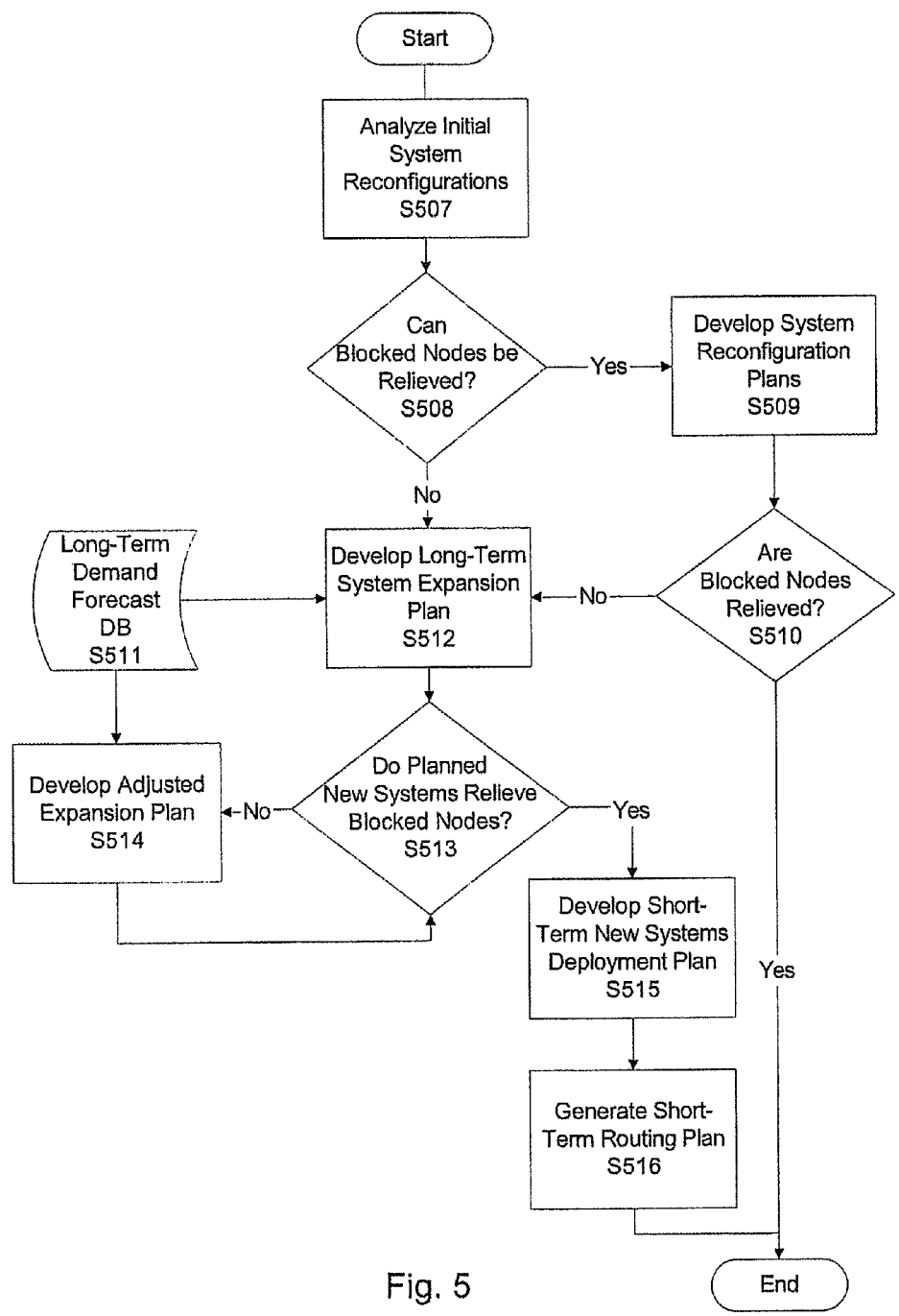
FIG. 5 shows an exemplary process for developing network plans based on the projected short-term node blockage determination, according to an aspect of the present disclosure.

FIG. 5 shows an exemplary process for developing and checking network planning based on the projected short-term node blockage report information. At step S507, using the generated projected node (CO) blockage report and theoretical network optimized circuit routes and topologies, potential circuit rearrangements and system reconfigurations to relieve blocked COs are evaluated. The results may be passed, for example, to a decision module to determine whether the circuit rearrangements or system reconfiguration solutions are viable.

At step S508, the circuit rearrangements and/or systems reconfiguration solutions are evaluated to determine whether they are acceptable solutions to relieve the projected blocked COs. If so (S508—YES), the process proceeds to step S509, at which the circuit rearrangement and/or system reconfiguration solutions will be developed using any appropriate processes and tools. At step S510, the developed plans are checked to determined the impact on the blocked COs, determining whether the blocked nodes will be relieved. When it is determined that the blocked nodes will be relieved (step S510—YES), the process ends.

When at step S508 or step S510 it is determined that the blocked nodes cannot (or will not) be relieved, a new build path is selected. More particularly, at step S512, a long-term system expansion plan for the network is developed using any appropriate processes and tools, based in part on long-term demand forecasts extracted from a long-term demand forecast database at step S511. At step S513, the developed long-term expansion plan is evaluated to determine whether it could relieve the exhausted COs.

When the long-term expansion plan does not relieve the exhausted COs (Step S513—NO), the process proceeds to step S514 to develop an adjusted long-term expansion plan. The adjusted expansion plan may likewise be based on the long-term forecasts extracted, for example, from the long-term demand forecast database at step S511. The adjusted long-term expansion plan is then evaluated at step S513 to determine whether it could relieve the exhausted COs. The process may be repeated until an adequate adjusted long-term expansion plan is developed.

When a long-term plan is determined to relieve the blocked nodes at step S513 (S513—YES), a short-term deployment plan will be developed at step S515. The short-term deployment plan may provide a list of required systems in order of priority. At step S516, a short-term routing plan is generated and can be used, for example, for automated provisioning of new short-term builds.

Although FIGS. 2 and 5 depict a particular sequence of steps, it is understood that the sequence is exemplary to an embodiment, and is not intended to be limiting. For example, in alternative embodiments, the order of the steps may differ, or the various steps may occur simultaneously, without affecting the scope or spirit of the disclosure. Also, although depicted linearly, the various embodiments may be implemented through various programming techniques with appropriate arrangements.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed:

1. A method for relieving network node congestion, comprising:
   determining, using a processor of a tangible computer, an average of an aggregated load on a network node that routes network traffic, using historical data of the network node for a past period of time;
   projecting a future demand on the network node by extrapolating the average of the aggregated load to a future period of time greater than one month;
   determining a current level of congestion on the network node;
   projecting a future level of congestion on the network node based on the projected future demand and the current level of congestion;
   determining an available capacity of other network nodes in a communication network that includes the network node; and
   determining whether the projected future level of congestion on the network node can be relieved in the future period of time using the determined available capacity of the other network nodes;
   wherein the communication network is reconfigurable to relieve the projected future level of congestion on the network when the projected future level of congestion can be relieved.

2. The method according to claim 1, in which determining the average of the aggregated load on the network node comprises:
   determining an interval average of the aggregated load for a selected interval within the past period of time; and
   determining the average of the aggregated load based on the determined interval average.

3. The method according to claim 1, further comprising:
   checking integrity of the historical data, and
   correcting missing quantities in the historical data.

4. The method according to claim 1, further comprising:
   developing an expansion plan to add new network nodes to the communication network.

5. The method according to claim 4, further comprising:
   determining whether the projected future level of congestion can be relieved using the determined available capacity and the developed expansion plan.

6. The method according to claim 5, further comprising:
   adjusting the developed expansion plan when the projected future level of congestion cannot be relieved.

7. The method according to claim 6, further comprising:
   determining whether the projected future level of congestion can be relieved using the determined available capacity and the adjusted developed expansion plan.

8. The method according to claim 1, further comprising:
   generating and confirming a short-term relief plan involving reallocating other existing network nodes; and
   generating and confirming a long-term relief plan involving new network nodes.

9. The method according to claim 1, in which determining the current level of congestion on the network node comprises applying the following formula:

$$B_{n,i} = (\Sigma \text{all links } C_{u,i})/(\Sigma \text{all links } C_{t,i})$$

where $B_{n,i}$ is the congestion on node "i", with total capacity for all links to a node $C_{t,i}$ and used capacity for all links to a node $C_{u,i}$.

10. The method according to claim 1, further comprising:
    extracting network data from a database, wherein the determining the average of the aggregated load on the network node is based on the extracted network data.

11. The method according to claim 10, wherein the extracted network data comprises the historical data and wherein the historical data relates to utilization of the network node.

12. The method according to claim 1, further comprising: extracting network data from a database, wherein the determining the current level of congestion on the network node is based on the extracted network data.

13. The method according to claim 12, wherein the extracted network data comprises the historical data and wherein the historical data relates to utilization of the network node.

14. The method according to claim 12, wherein the extracted network data comprises transport system data corresponding to the network node, and wherein determining the current level of congestion on the network node is based on the transport system data.

15. A non-transitory computer readable medium that stores a set of executable instructions for relieving network node congestion, the set of executable instructions directing a processor to perform an act of:
determining an average of an aggregated load on a network node that routes network traffic, using historical data of the network node for a past period of time;
wherein a future demand on the network node is projected by extrapolating the average of the aggregated load to a future period of time greater than one month;
wherein a current level of congestion on the network node is determined;
wherein a future level of congestion on the network node is projected based on the projected demand and the current level of congestion;
wherein available capacity of other network nodes in a communication network that includes the network node is determined;
wherein whether the projected future level of congestion on the network node can be relieved in the future period of time using the determined available capacity of the other network nodes is determined, and
wherein the communication network is reconfigurable to relieve the projected future level of congestion on the network when the projected future level of congestion can be relieved.

16. The non-transitory computer readable medium according to claim 15, the set of executable instructions further directing a processor to perform acts of:
generating a node congestion report based on the projected future level of congestion on the network node, and displaying the node congestion report.

17. The non-transitory computer readable medium according to claim 15, the set of executable instructions further directing a processor to perform an act of:
extracting network data from a database,
wherein the extracted network data comprises the historical data, the historical data relates to utilization of the network node, and the average of the aggregated load on the network node is determined based on the historical data.

18. The non-transitory computer readable medium according to claim 15, the set of executable instructions further directing a processor to perform an act of:
extracting network data from a database,
wherein the extracted network data comprises the historical data, the historical data comprises transport system data corresponding to the network node, and the level of congestion on the network node is projected based on the transport system data.

19. A computer for relieving network node congestion, the computer comprising:
a memory that stores executable instructions, and
a processor that executes the executable instructions,
wherein, when executed, the instructions cause the computer to determine an average of an aggregated load on a network node that routes network traffic, using historical data of the network node for a past period of time,
wherein a future demand on the network node is projected by extrapolating the average of the aggregated load to a future period of time greater than one month;
wherein a current level of congestion on the network node is determined,
wherein a future level of congestion on the network node is projected based on the projected demand and the current level of congestion;
wherein available capacity of other network nodes in a communication network that includes the network node is determined;
wherein, whether the projected future level of congestion on the network node can be relieved in the future period of time using the determined available capacity of the other network nodes is determined,
wherein the communication network is reconfigurable to relieve the projected future level of congestion on the network when the projected future level of congestion can be relieved.

20. The computer according to claim 19, wherein a projected node congestion report is generated based on a projected future level of short-term congestion,
wherein the projected node congestion report is displayed on a graphical user interface,
wherein a circuit rearrangement in the network is identified in response to the node congestion report, and
wherein whether the circuit rearrangement relieves the projected future level of short-term congestion on the network node is determined.

* * * * *

UNITED STATES PATENT AND TRADEMARK OFFICE
CERTIFICATE OF CORRECTION

PATENT NO. : 9,237,104 B2
APPLICATION NO. : 13/870352
DATED : January 12, 2016
INVENTOR(S) : A. Zolfaghari et al.

Page 1 of 1

It is certified that error appears in the above-identified patent and that said Letters Patent is hereby corrected as shown below:

Title page, item (72) Inventors: line 6, "Keamy, MO" should be -- Kearney, MO --

Signed and Sealed this
Tenth Day of May, 2016

Michelle K. Lee
*Director of the United States Patent and Trademark Office*